United States Patent [19]
Mizukami

[11] Patent Number: 5,816,925
[45] Date of Patent: Oct. 6, 1998

[54] DAMPER DISK ASSEMBLY, FRICTIONAL COUPLING PORTION AND CLUTCH DISK ASSEMBLY

[75] Inventor: Hiroshi Mizukami, Neyagawa, Japan

[73] Assignee: EXEDY Corporation, Osaka, Japan

[21] Appl. No.: 719,916

[22] Filed: Sep. 25, 1996

[30] Foreign Application Priority Data

Oct. 20, 1995 [JP] Japan ..................................... 7-272927

[51] Int. Cl.[6] .................................................. F16D 3/12
[52] U.S. Cl. ........................................ 464/68; 192/213.22
[58] Field of Search .................. 464/66, 68; 192/213.22, 192/213.12; 74/574

[56] References Cited

U.S. PATENT DOCUMENTS

| | | | |
|---|---|---|---|
| 4,493,408 | 1/1985 | Nagano . | |
| 4,560,054 | 12/1985 | Kayanoki et al. | 464/66 |
| 4,585,428 | 4/1986 | Asada | 464/68 |
| 4,591,348 | 5/1986 | Takeuchi et al. | 192/213.22 |
| 4,684,007 | 8/1987 | Maucher | 192/213.22 |
| 4,741,423 | 5/1988 | Hayen | 464/68 |
| 4,924,990 | 5/1990 | Takeuchi | 464/213.22 |
| 5,314,052 | 5/1994 | Henrion . | |
| 5,322,474 | 6/1994 | Hasimoto et al. | 464/68 |
| 5,590,752 | 1/1997 | Takehira et al. | 464/68 |

FOREIGN PATENT DOCUMENTS

| | | |
|---|---|---|
| 0 093 176 | 11/1983 | European Pat. Off. . |
| 0 342 865 | 11/1989 | European Pat. Off. . |
| 3138943 A1 | 9/1981 | Germany . |
| 1400408 | 7/1975 | United Kingdom . |
| 1418890 | 12/1975 | United Kingdom . |
| 2093564 | 9/1982 | United Kingdom . |
| 2098702 | 11/1982 | United Kingdom . |
| 2141209 | 12/1984 | United Kingdom . |
| 2244313 | 11/1991 | United Kingdom . |

*Primary Examiner*—Eileen A. Dunn
*Attorney, Agent, or Firm*—Shinjyu An Intellectual Property Firm

[57] ABSTRACT

In a clutch disk assembly 1, first and second flange plates 3 and 4 are disposed between first and second sub-plates 5 and 6. First and second retaining plates 7 and 8 are disposed at opposite sides of a group of the first and second retaining plates 7 and 8 and the flange plates 5 and 6, and are fixed together. First coil springs 9 are disposed axially between the first and second retaining plates 7 and 8. Within a first displacement range of relative rotation between plates 3 and 4 and the plates 7 and 8, both the coil springs 9 and 10 are compressed. Within a second displacement range larger than the first displacement range, the plates 3 and 4 are brought into contact with the second coil springs 10, so that only the second coil springs 10 undergo further compression.

14 Claims, 10 Drawing Sheets

DAMPER DISK ASSEMBLY, FRICTIONAL COUPLING PORTION AND CLUTCH DISK ASSEMBLY

BACKGROUND OF THE INVENTION

A. Field of the Invention

The present invention relates to a damper disk assembly, and in particular to a damper disk assembly having vibration characteristics which include a generally high level of rigidity and the ability to withstand generally high levels of vibrational torque.

B. Description of the Background Art

A clutch disk assembly for use in a motor vehicle clutch generally includes a clutch plate and a retaining plate which serve as input members, a hub which serves as an output member, the hub being disposed between these plates, elastic members such as coil springs which circumferentially couple the plates to the hub, and a hysteresis torque generating mechanism for generating a hysteresis torque when the plates rotate relative to the hub. The components of the above described clutch disk assembly are configured to undergo a large torsion angle displacement and exhibit a generally low level of rigidity for damping torsion vibrations during operation. For this purpose, the assembly employs a plurality of coil springs arranged in series.

Japanese Laid-Open Patent Publication No. 5-240304 (1993) has disclosed a clutch disk assembly in which two elastic members are compressed in series when a torsion angle is small, and only one of them is compressed when the torsion angle is large. This achieves a low rigidity and a high stop torque, where the stop torque is defined as the level of torque transmitted with the various components of the damper disk assembly at it largest possible relative displacement angle. Therefore a high stop torque is the maximum transmittable torque at the largest torsion angle.

In recent years, composite materials formed of ceramics and metal have been used as friction members in frictional coupling portions of clutch disk assemblies in order to comply with demands for increase in speed and torque of vehicles. Such friction members are produced by high pressure molding of powder mixture of metal and ceramics at a room temperature and subsequent sintering at a high temperature in a reducing atmosphere. A pair of friction members thus produced are joined to opposite sides of a core plate, e.g., during the sintering process.

In the conventional clutch disk assembly described above, four coil springs are disposed in windows or openings formed at the clutch and retaining plates. The four windows in each plate reduces a durability of the plate.

A problem is associated with using a configuration where four coil springs are employed in the circumferential direction in a damper assembly. The problem is that the configuration requires an increase in the overall size of the assembly.

Further, since the frictional coupling portion, which uses the friction members made of a composite material of metal and ceramics, does not have a cushioning capabilities, the friction members are liable to be worn rapidly.

SUMMARY OF THE INVENTION

An object of the invention is to improve a durability of plates in a damper disk assembly, of which characteristics exhibit a low rigidity and a high stop torque.

Another object of the invention is to minimize the size of a damper disk assembly whose characteristics exhibit a low rigidity and a high stop torque.

Still another object of the invention is to reduce wear or abrasion of a friction member used in a frictional coupling portion, where the frictional coupling portion includes members made of a composite material of metal and ceramics.

In accordance with one aspect of the present invention, a damper disk assembly includes first, second and third rotary disk members concentrically disposed adjacent to one another for limited rotary displacement with respect to one another. A first elastic member is circumferentially disposed between the first and second rotary disk members, the first elastic member being compressible in response to relative rotary displacement between the first and second rotary disk members. A second elastic member is disposed between the second and third rotary disk members, the second elastic member being compressible in response to relative rotary displacement between the second and third rotary disk members, and the second elastic member being radially offset from the first elastic member. The first and second elastic members are both compressible in response to relative rotary displacement within a first displacement range defined between the first, second and third rotary disk members. In a second displacement range, the first rotary disk member contacts the second elastic member such that the first and second rotary member rotate together with respect to the third rotary member further compressing the second elastic member.

Preferably, the first and second elastic members have differing levels of rigidity.

Preferably, the third rotary disk member includes a pair of disk members fixed together and axially spaced from each other with the first and second rotary disk members being disposed therebetween. Further, the first elastic member is disposed axially between the pair of members of the third rotary member.

Preferably, the damper disk assembly further includes a hub disposed concentric and radially inwardly with respect to the first, second and third rotary disk members. Preferably, the hub is configured for limited rotary displacement within an initial displacement range with respect to the third rotary disk member.

Preferably, the damper disk assembly further includes a friction generating mechanism disposed between the third rotary disk member and the hub for generating friction in response to relative rotary displacement between the third rotary disk member and the hub in the initial displacement range.

The foregoing and other objects, features, aspects and advantages of the present invention will become more apparent from the following detailed description, when taken in conjunction with the accompanying drawings.

DESCRIPTION OF THE PREFERRED EMBODIMENTS

FIRST EMBODIMENT

Figure 1:
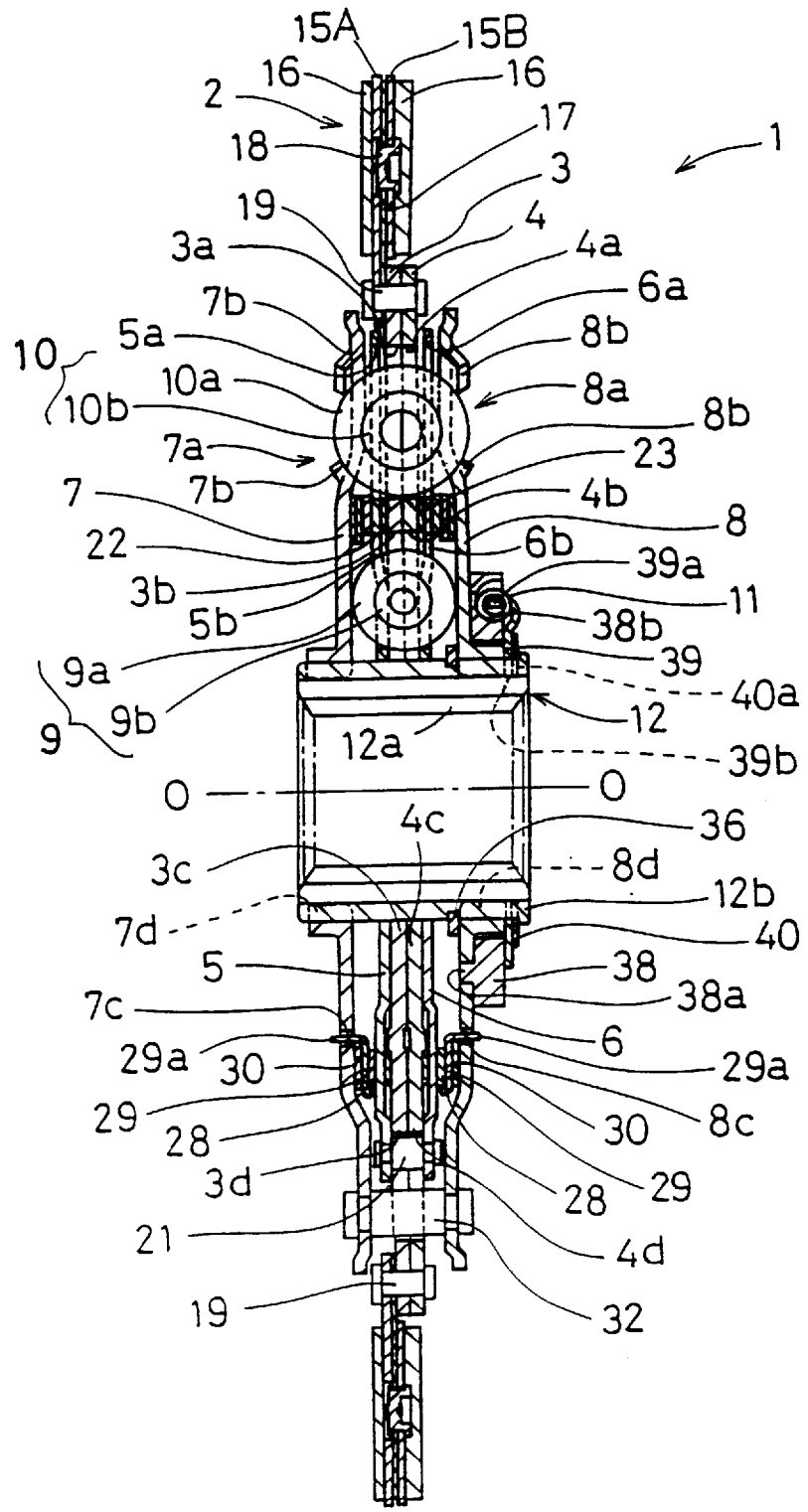
FIG. 1 is a cross section of a clutch disk assembly in accordance with a first embodiment of the present invention.
Figure 2:
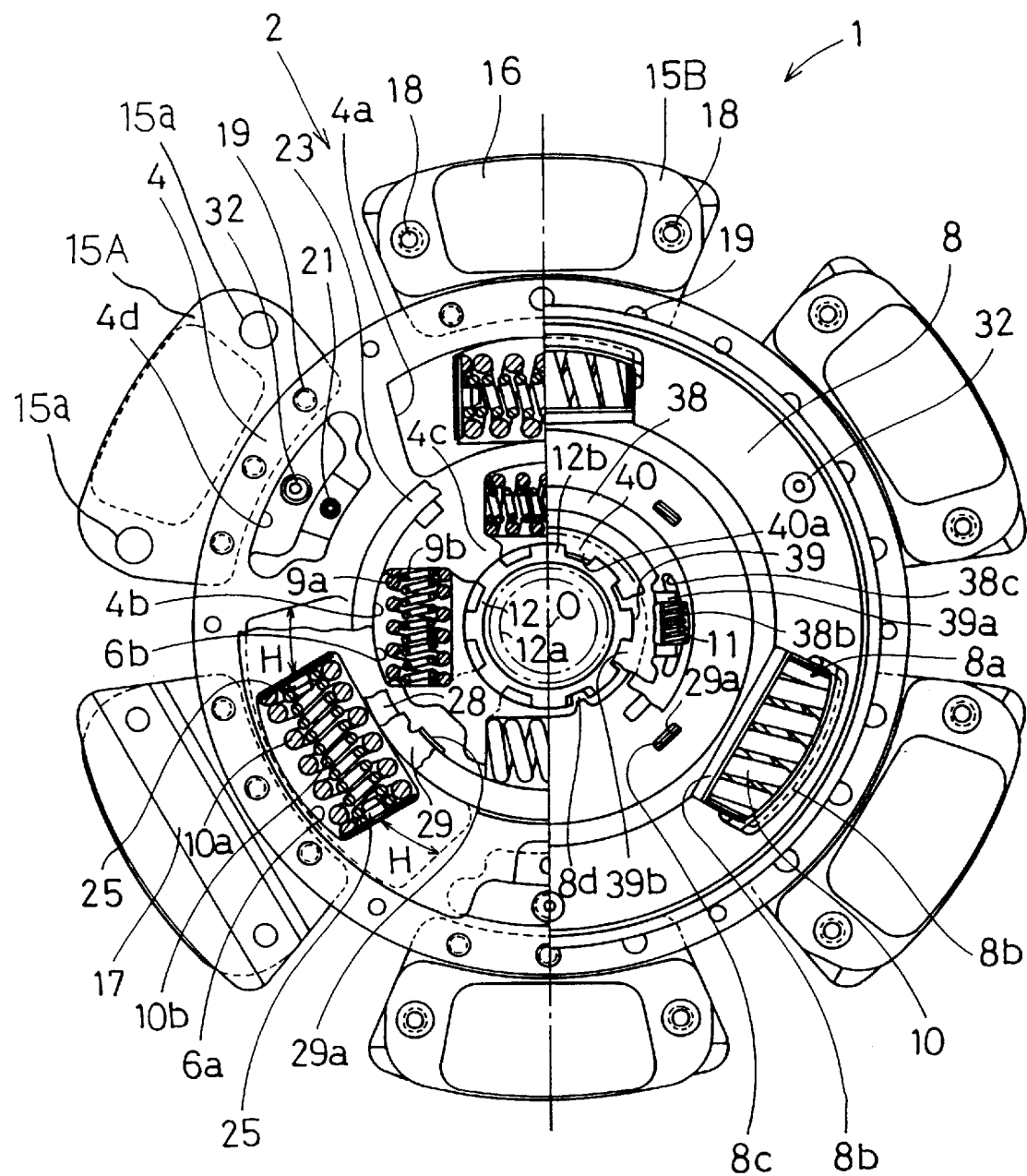
FIG. 2 is part elevation, part cross-section, part cut-away end view of the clutch disk assembly shown in FIG. 1.

A clutch disk assembly 1 shown in FIGS. 1 and 2 is a device for controllably transmitting a torque from a flywheel (not shown) of an engine (not shown) to a transmission (not shown). Line O—O in FIG. 1 represents an axis of rotation of the clutch disk assembly 1. The engine (not shown) is positioned to the left in FIG. 1 and the transmission (not shown) is positioned to the right in FIG. 1. Hereinafter, to the left side of FIG. 1 will be referred to as the engine side and to the right side of FIG. 1 will be referred to as the transmission side.

The clutch disk assembly 1 basically includes a frictional coupling portion 2, first and second flange plates 3 and 4, first and second sub-plates 5 and 6, first and second retaining plates 7 and 8, a plurality of first coil springs 9a,9b second coil springs 10a & 10b third coil springs 11 and a hub 12.

The frictional coupling portion 2 is operable to be pressed against the unillustrated flywheel by an unillustrated pressure plate. The frictional coupling portion 2 is formed of a plurality of plate portions, as shown in FIG. 2. Each plate portion basically includes first and second core plates 15A and 15B formed of steel plates, friction members 16, each of which is fixed to an outside surface of the core plate 15A or 15B and is made of a composite material of ceramics and metal, cushioning plates 17 arranged between the core plates 15A and 15B, and fasteners 18 connecting the second core plates to the cushioning plates 17, respectively. The first core plates 15A and the cushioning plates 17 at the engine side are fixed at their radially inner portions to radially outer portions of the first and second flange plates 3 and 4 by a plurality of rivets 19. Each cushioning plate 17 has stepped portions with respect to the radial direction, so that inner and outer peripheral portions are in contact with the first core plate 15A and a radially middle portion is in contact with the second core plate 15B. Since the cushioning plates 17 have the stepped portions with respect to the radial direction, as shown in FIG. 2, each plate portion is not required to have an unnecessarily increased circumferential length, so that a simple and compact structure is achieved. The fasteners 18 are arranged at circumferentially opposite ends of each second core plate 15B. Each first core plate 15A is provided at positions corresponding to the fasteners 18 with apertures 15a. The friction member 16 on each first core plate 15A is located circumferentially between the apertures 15a. The friction member 16 on the second core plate 15B is located circumferentially between the fasteners 18. The friction member 16 has an area smaller by 15% than that of the conventional structure. This is allowed because provision of the cushioning plates 17 can maintain the surface pressure of a conventional value even with a reduced area of the friction member 16. As a result, the frictional coupling portion 2 has a reduced weight.

The cushioning plate 17 can produce such an effect that abrasion of the friction member can be reduced if the friction member has an area as much as that in the prior art. Further, it can reduce a vibration or the like when a vehicle starts, and therefore enables smooth start.

The first and second flange plates 3 and 4 are circular, and are fixed together for integral rotation by the rivets 19. Each of the first and second plates 3 and 4 is provided at its radially outer portions with three circumferentially extending windows 3a and 4a, respectively, and each of the first and second plates 3 and 4 is also provided at positions radially inside the first windows 3a and 4a with four windows 3b and 4b, respectively, which are circumferentially equally spaced from each other. The second windows 3b and 4b are opened radially inwardly. Projected portions 3c and 4c which are located circumferentially between the windows 3b and 4b, respectively, extend radially inward to the vicinity of an outer peripheral surface of the hub 12, which will be described further below.

The first and second flange plates 3 and 4 are also provided with pin travel apertures or openings 3d and 4d, which are circumferentially long and located between the first windows 3a, and between windows 4a, respectively. Each of the pin travel apertures 3d and 4d has a radially outer portion which is circumferentially longer than a radially inner portion.

The first and second sub-plates 5 and 6 are circular, and are spaced from each other with the first and second flange plates 3 and 4 therebetween. The first and second sub-plates 5 and 6 are each provided with three first windows 5a and 6a, respectively, corresponding to the first windows 3a and 4a of the first and second flange plate 3 and 4. The first and second sub-plates 5 and 6 are fixed together at their outer peripheral portions by a plurality of first stop pins 21. The first stop pins 21 extend through the radially inner portions of the pin travel apertures 3d and 4d formed at the plates 3 and 4, respectively. The first and second sub-plates 5 and 6 is provided at its radially inner portions with four second windows 5b and 6b corresponding to the second windows 3b and 4b at the plate 3 or 4, respectively. The first coil springs 9 are disposed in the second windows 3b, 4b, 5b and 6b, and each have opposite ends which are in contact with the edges of each window in the torsion free state shown in FIG. 2. Each of the first coil springs 9 includes a large coil spring 9a and a small coil spring 9b disposed inside the spring 9a, as shown in FIG. 1.

The first and second retaining plates 7 and 8 are circular, and are spaced from each other with the first and second sub-plates 5 and 6 therebetween. The first and second retaining plates 7 and 8 are fixed together by a plurality of second stop pins 32. The second stop pins 32 extend through the radially outer portions of the pin travel apertures 3d and 4d formed at the first and second flange plates 3 and 4, respectively. The first and second retaining plates 7 and 8 are provided at their inner peripheries with a plurality of inner peripheral teeth 7d and 8d, i.e., teeth projected radially inwardly, respectively. The inner peripheral teeth 7d and 8d extend axially. The first and second retaining plates 7 and 8 are further provided at its radially middle portions with four engagement apertures 7c or 8c, respectively, which are circumferentially equally spaced from each other.

The first and second retaining plates 7 and 8 are provided at its radially outer portions with three windows 7a and 8b, respectively, corresponding to the first windows 5a and 6a. Radially inner and outer edges of the windows 7a and 8b are defined by bent portions 7b and 8b.

The second coil springs 10 are disposed in the first windows 3a, 4a, 5a and 6a and the windows 7a and 8a. Each of the second coil springs 10 is formed of a large coil spring 10a and a small coil spring 10b disposed inside the spring 10a, and has a higher rigidity than the first coil spring 9. Opposite ends of each second coil spring 10 are seated on spring seats 25. Each spring seat 25 is in contact with the edges of the first windows 5a and 6a and windows 7a and 8a, but is circumferentially spaced by an angle H (see FIGS. 2 and 3) from the ends or edges of the first windows 3a and 4a.

A first friction washer 22 is disposed axially between the first flange plate 3 and the first sub-plate 5 and is located radially between the first and second coil springs 9 and 10. A second friction washer 23 is disposed axially between the second flange plate 4 and the second sub-plate 6 and is located radially between the first and second coil springs 9 and 10.

A third friction washer 28, a friction plate 29 and a first conical spring 30, which are aligned in this order from the first sub-plate 5 side, are disposed axially between the first retaining plate 7 and the first sub-plate 5 and are located radially between the first and second coil springs 9 and 10. The friction plate 29 is provided at its inner periphery with axially projected four engagement portions 29a. The engagement portions 29a are engaged relatively unrotatably but axially movably with the engagement apertures 7c at the first retaining plate 7. The first conical spring 30 is axially compressed.

The hub 12 is disposed at centers of the plates 3, 4, 5, 6, 7 and 8. The hub 12 is provided at its inner periphery with spline teeth 12a which are engaged with a shaft (not shown) extending from the transmission. The hub 12 is also has outer teeth 12b at its outer periphery. The outer teeth 12b are engaged with the inner teeth 7d and 8d of the first and second retaining plates 7 and 8. Circumferential spaces are maintained between the inner teeth 7d and 8d and the outer teeth 12b. A snap ring or retainer 36 is fixed at the outer peripheral surface of the hub 12. The snap ring 36 is in contact with a surface of the inner peripheral portion of the second retaining plate 8 (particularly, the left surface in FIG. 1 toward the engine side).

A stationary washer 38 is fixed at a portion near the transmission of the inner periphery of the second retaining plate 8. The stationary washer 38 is provided with a projection 38a which projects into an aperture formed at the second retaining plate 8 without allowing relative rotation. An accommodation concavity 38b is formed at a surface of the stationary washer 38 on the transmission side. Narrow slide grooves 38c which extend circumferentially are formed at circumferentially opposite ends of the accommodation concavity 38b. In the accommodation concavity 38b, a third coil spring 11 having the lowest rigidity is disposed.

An engagement plate 39 is circular, and is close to the surface of the stationary washer 38 near the transmission. The engagement plate 39 has a pair of engaging portions 39a, which extend radially outward from its outer periphery and have outer portions bent toward the engine. The engaging portions 39a carry the opposite ends of the third coil spring 11, and extend in the slide grooves 38c. The engagement plate 39 is provided at its inner periphery with inner teeth 39b engaged with the outer teeth 12b of the hub 12.

A second conical spring 40 is disposed on a surface of the engagement plate 39 near the transmission. The second conical spring 40 is provided at its inner periphery with inner teeth 40a, which are engaged with the outer teeth 12b of the hub 12 and are supported from the transmission side. As a result, the second conical spring 40 axially forces the engagement plate 39 against the stationary washer 38.

An operation of the first embodiment shown in FIGS. 1 and 2 is described below.

When the friction coupling portion 2 is coupled to the unillustrated flywheel, a torque is transmitted from the flywheel to the hub 12 through the frictional coupling portion 12, first and second flange plates 3 and 4, first coil springs 9, first and second sub-plates 5 and 6, second coil springs 10, first and second retaining plates 7 and 8, and third coil spring 11. The torque is then transmitted from the hub 12 to the unillustrated transmission.

When this clutch disk assembly 1 receives a torsional vibration due to variation in a combustion state of the engine, relative rotation periodically occurs between the respective plates, and the first, second and third coil springs 9, 10 and 11 are compressed. Also, frictional sliding occurs on the respective friction washers and others to cause a hysteresis.

Torsion Characteristics

Torsion characteristics of the clutch disk assembly 1 will now be described below with reference to FIGS. 3 to 6 which are torque transmission diagrams and FIG. 7 which is a torsion characteristic graph. In the following description with reference to FIGS. 3 to 6, the first and second flange plates 3 and 4 are depicted as if they remain stationary, and the hub 12 (not shown in FIGS. 3 to 6) rotates to move the plates 7 and 8 rightward in FIGS. 3 to 6. Therefore, as depicted in FIGS. 3 to 6, movement is referenced relative to the first and second flange plates 3 and 4.

Figure 7:
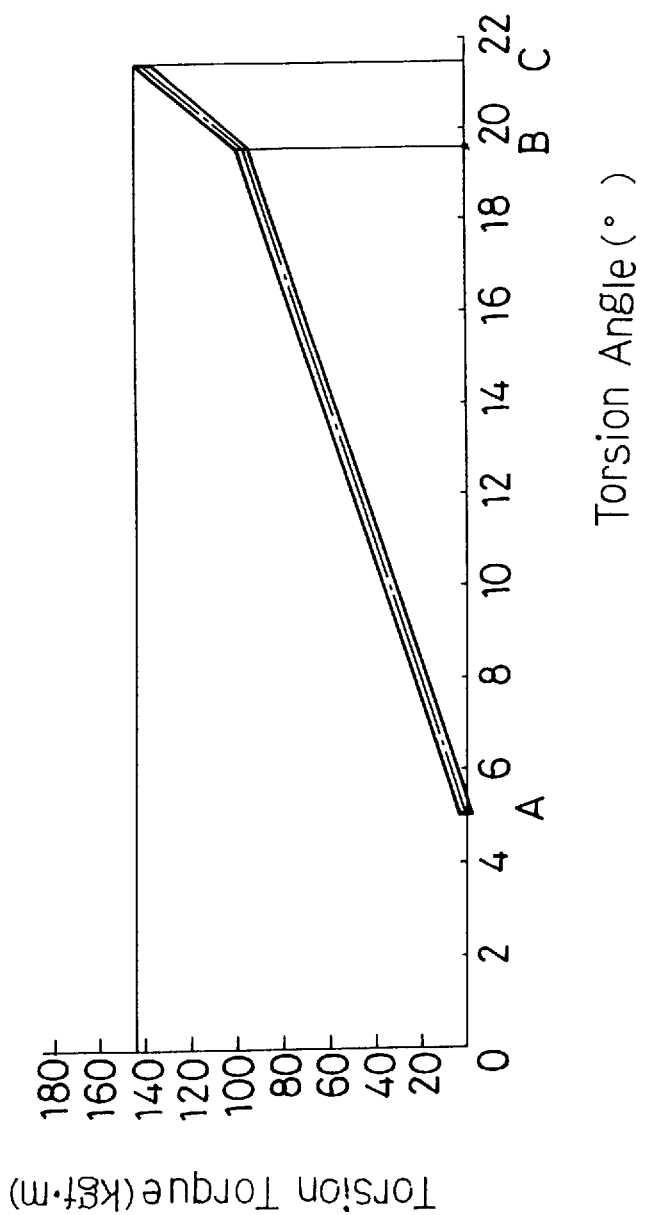
FIG. 7 is a graph showing torsion characteristics of the clutch disk assembly shown in FIGS. 1–6.

Initial Displacement Range between 0 to A in FIG. 7

In a range of a small torsion angle, the third coil spring 11 has a low rigidity and is compressed, and the hub 12 rotates relatively to the first and second retaining plates 7 and 8. In this range, frictional sliding occurs between the engagement plate 39 and the stationary washer 38 to cause a small hysteresis torque.

First Displacement Range from A to B in FIG. 7

Figure 3:
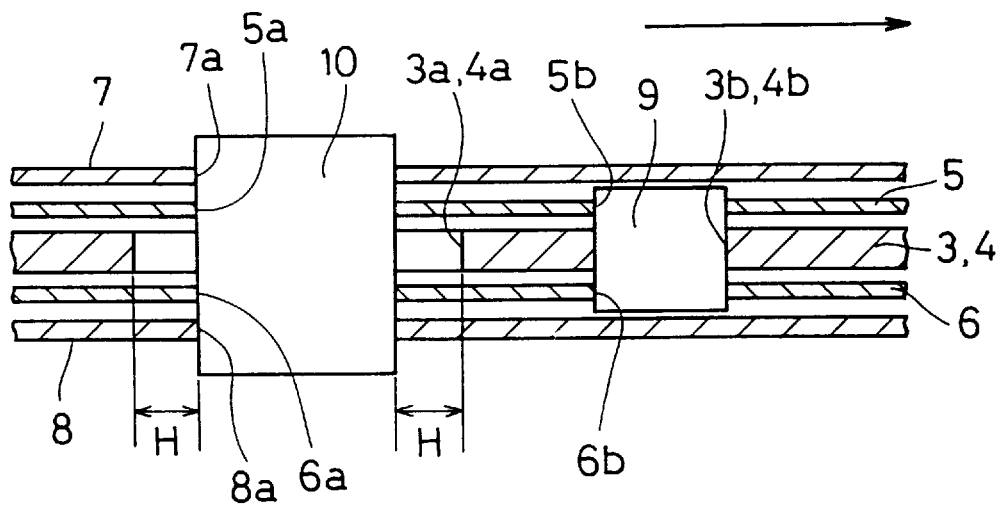
FIG. 3 is a fragmentary, cross-sectional view showing schematically the relative position of the displaceable components of the clutch disk assembly shown in FIG. 1, with the components shown in a first position during torque transmission but showing no relative displacement.
Figure 4:
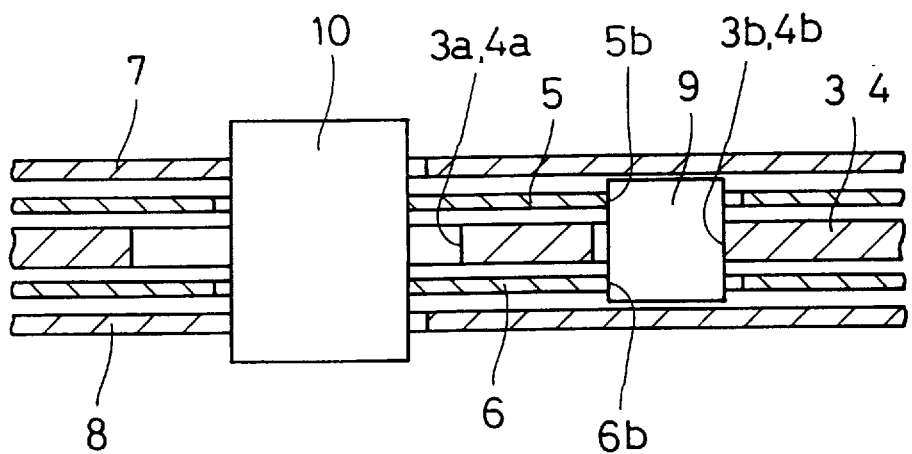
FIG. 4 is similar to FIG. 3, but shows the components of the clutch disk assembly undergoing a first level of relative displacement during torque transmission.
Figure 5:
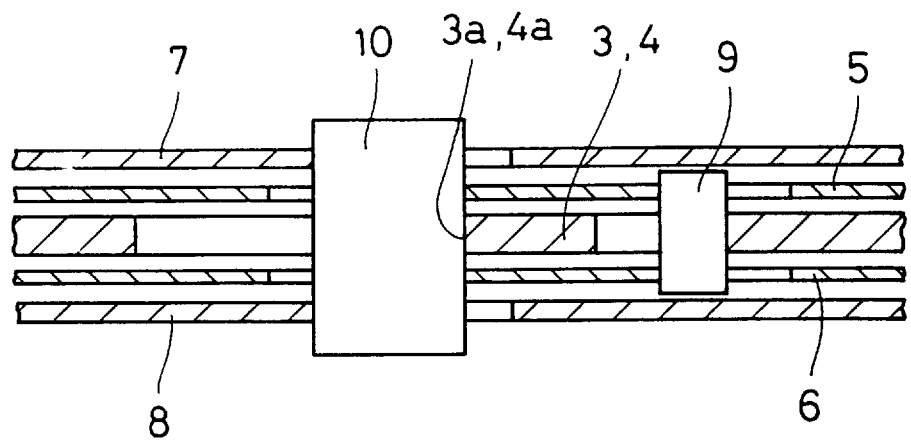
FIG. 5 is similar to FIGS. 3 and 4, but shows the components of the clutch disk assembly undergoing a second level of relative displacement during torque transmission.

In FIG. 7, when the torsion angle increases to A, the outer teeth 12b are brought into contact with the inner teeth 7d and 8d, and the first and second retaining plates 7 and 8 start to rotate together with the hub 12. Thereafter, as shown in FIGS. 3 and 4, the second and first coil springs 10 and 9 operate in series between the first and second retaining plates 7 and 8 and the first and second flange plates 3 and 4 through the first and second sub-plates 5 and 6. In this operation, both the first and second coil springs 9 and 10 are compressed, so that the characteristics exhibit a low rigidity. Since the first coil spring 9 has a lower rigidity than the second coil spring 10, it is compressed to a higher extent than the second coil spring 10.

In the above range, the two third friction washers 28 frictionally slide between the first and second sub-plates 5 and 6 and the friction plates 29 rotating together with the first and second retaining plates 7 and 8. Consequently, a large hysteresis torque is generated.

Second Displacement Range from B to C in FIG. 7

Figure 6:
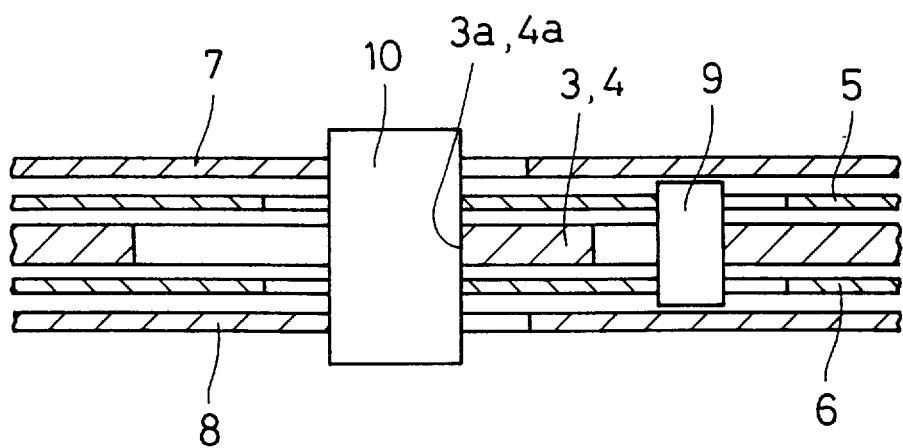
FIG. 6 is similar to FIGS. 3, 4 and 5, but shows the components of the clutch disk assembly undergoing a third level of relative displacement during torque transmission.

In FIG. 7, when the torsion angle increases to B, ends of the second coil springs 10 are brought into contact with the first windows 3a and 4a of the first and second flange plates 3 and 4, and thereafter, the second coil springs 10 are compressed between the first and second retaining plates 7 and 8 and the first and second flange plates 3 and 4. In this operation, as shown in FIG. 6, the first and second sub-plates 5 and 6 do not receive the torque from the first and second retaining plates 7 and 8, and therefore do not rotate relatively, so that the first coil springs 9 are not compressed. Thus, only the second coil springs 10 are compressed, so that the characteristics exhibit a high torsion rigidity. When the second stop pins 32 are brought into contact with the edges of the pin travel apertures 3d and 4d, the first and second retaining plates 7 and 8 rotate no longer relatively to the first and second flange plates 3 and 4.

In this range, the two third friction washers 28 frictionally slide between the first and second sub-plates 5 and 6 and the friction plates 29 rotating together with the first and second retaining plates 7 and 8. Consequently, a large hysteresis torque is generated.

In this manner, a low rigidity is exhibited in a range of a small torsion angle, and a high rigidity is exhibited in a range of a large torsion angle, so that both the low rigidity and the high stop torque can be achieved.

Further, it is not necessary to form recesses or windows at the first and second retaining plates 7 and 8, because the first coil springs 9 are disposed axially between the first and second retaining plates 7 and 8. Therefore, the first and second retaining plates 7 and 8 can have an improved durability against the torque transmission.

Since the small coil springs 9 are disposed radially inside the second coil springs 10, the size of the whole assembly is reduced or minimized. In a range of a high torsion angle, the torque is transmitted via the second coil springs 10 disposed at the radially outer position, so that the transmittable torque can be sufficiently high.

SECOND EMBODIMENT

Figure 8:
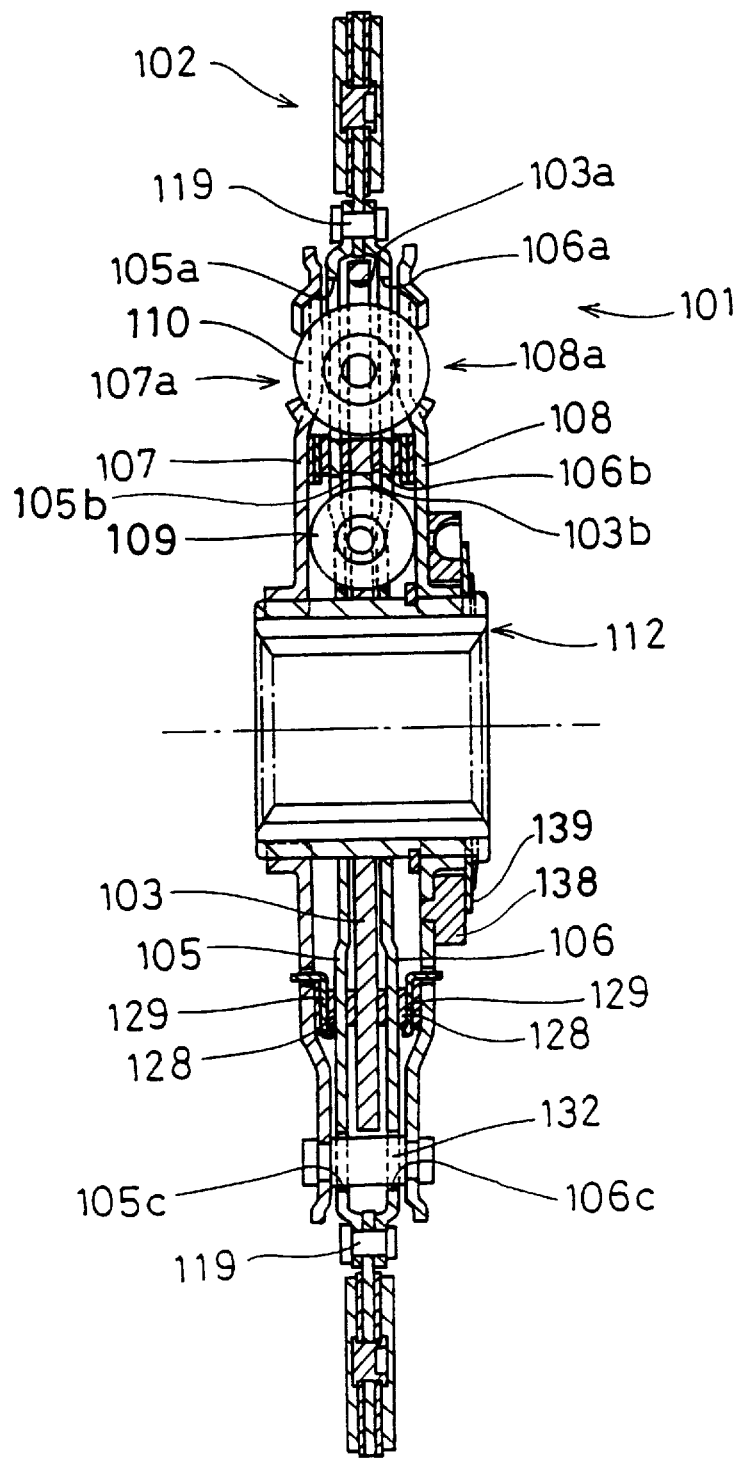
FIG. 8 is a cross section of a clutch disk assembly in accordance with a second embodiment of the present invention.
Figure 9:
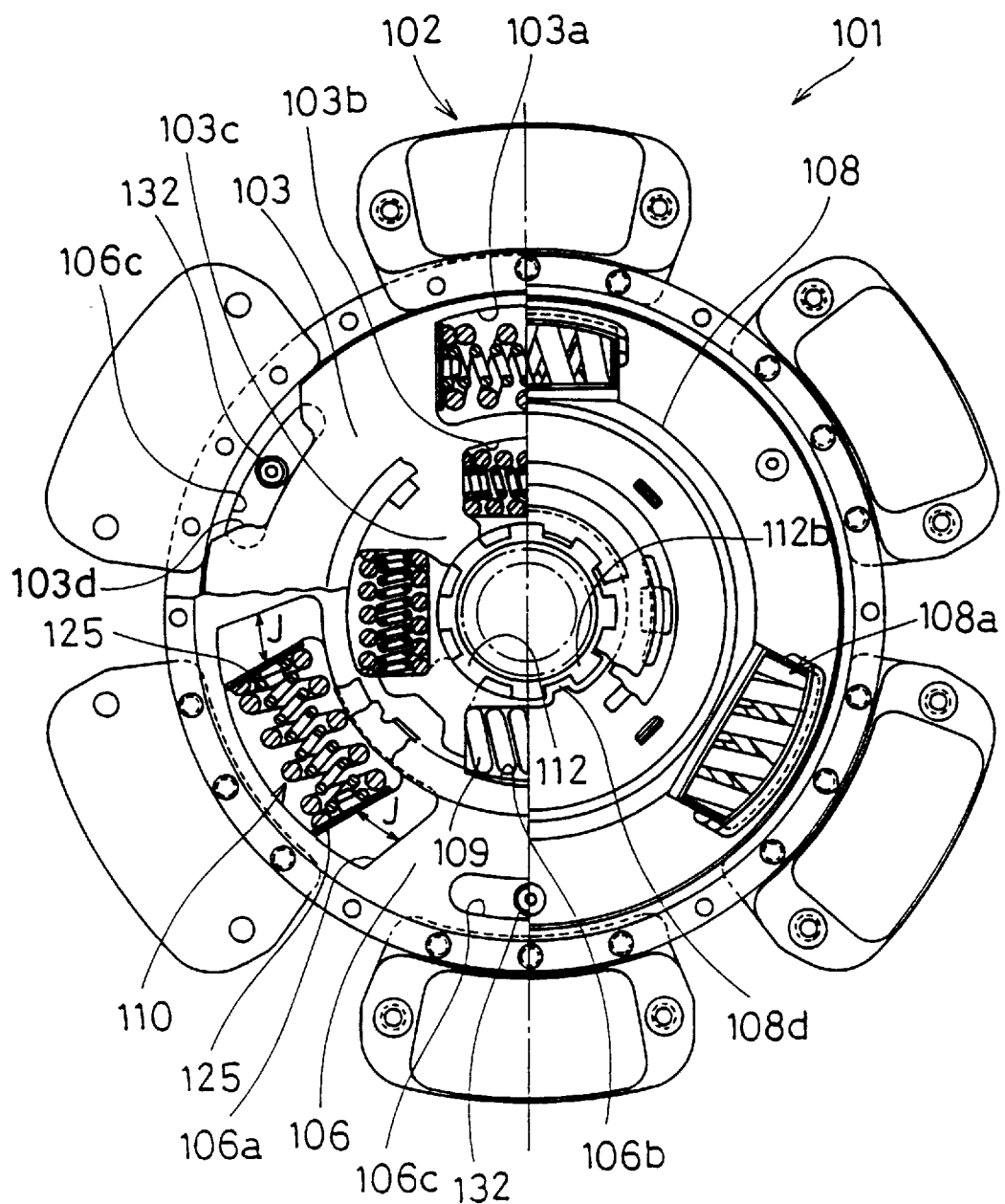
FIG. 9 is part elevation, part cross-section, part cut-away end view of the clutch disk assembly shown in FIG. 8.

A clutch disk assembly 101 in accordance with a second embodiment is shown in FIGS. 8 and 9 and has many structural features that are similar or generally the same as those of the clutch disk assembly 1 in the first embodiment. Therefore, only the major features that differ from the features of the first embodiment will be described in detail below with respect to the second embodiment.

Each plate portion of a frictional coupling portion 102 is fixed to outer peripheral portions of first and second sub-plates 105 and 106 by a plurality of rivets 119. Thus, the rivets 119 fix the outer peripheral portions of the first and second sub-plates 105 and 106 together. A flange plate 103 is disposed axially between the first and second sub-plates 105 and 106, which are disposed between first and second retaining plates 107 and 108. First coil springs 109 are disposed in second windows 103b at the flange plate 103 and second windows 105b and 106b at the first and second sub-plates 105 and 106. The first coil springs 109 are located axially between radially inner portions of the first and second retaining plates 107 and 108. Second coil springs 110 are disposed in first windows 103a at the flange plate 103, the first windows 105a and 106a at the first and second sub-plates 105 and 106, and windows 107a and 108a at the first and second retaining plates 107 and 108. Spring seats 125 at circumferentially opposite ends of each second coil spring 110 are in contact with edges of the windows 103a, 107a and 108a, but are circumferentially spaced by a predetermined angle J (see FIGS. 9 and 10) from edges of the first windows 105a and 106a at the first and second sub-plates 105 and 106.

The first and second retaining plates 107 and 108 are fixed to one another by stop pins 132. The pins 132 extend through slots 105c and 106c formed in the first and second sub-plates 105 and 106. The pins 132 further extend through openings 103d formed in the flange plate 103. As is shown in FIG. 9, the circumferential length of each opening 103d is shorter than that of each slot 106c.

A space smaller than that in the first embodiment is ensured between each of outer teeth 112b of a hub 112 and each of inner teeth 107d and 108d of the first and second retaining plates 107 and 108. In contrast to the first embodiment, the assembly does not include an elastic member for applying a resistance against relative rotation between the hub and the retaining plates.

An operation will be described below.

When the frictional coupling portion 2 is coupled to an unillustrated flywheel, a torque is transmitted from the flywheel to the hub 112 through the frictional coupling portion 102, first and second sub-plates 105 and 106, first coil springs 109, flange plate 103, second coil springs 110, and first and second retaining plates 107 and 108. The torque is then transmitted from the hub 112 to the unillustrated transmission.

When this clutch disk assembly 101 receives a torsional vibration due to variation in a combustion state of the engine, relative rotation periodically occurs between the respective plates, and the first and second coil springs 109 and 110 are compressed. Also, frictional sliding occurs on the respective friction washers and others to cause a hysteresis torque.

Torsion Characteristics

Torsion characteristics of the clutch disk assembly 101 will now be described below with reference to FIGS. 10 to 13 which are torque transmission diagrams and FIG. 14 which is a torsion characteristic graph. In the following description, all movement is depicted relative to the first and second sub-plates 105 and 106. Therefore, the first and second sub-plates 105 and 106 are shown stationary in FIGS. 10–13, and the hub 112 (not shown in FIGS. 10 to 13) rotates to move the plates 107 and 108 rightward in FIGS. 10 to 13.

Figure 14:
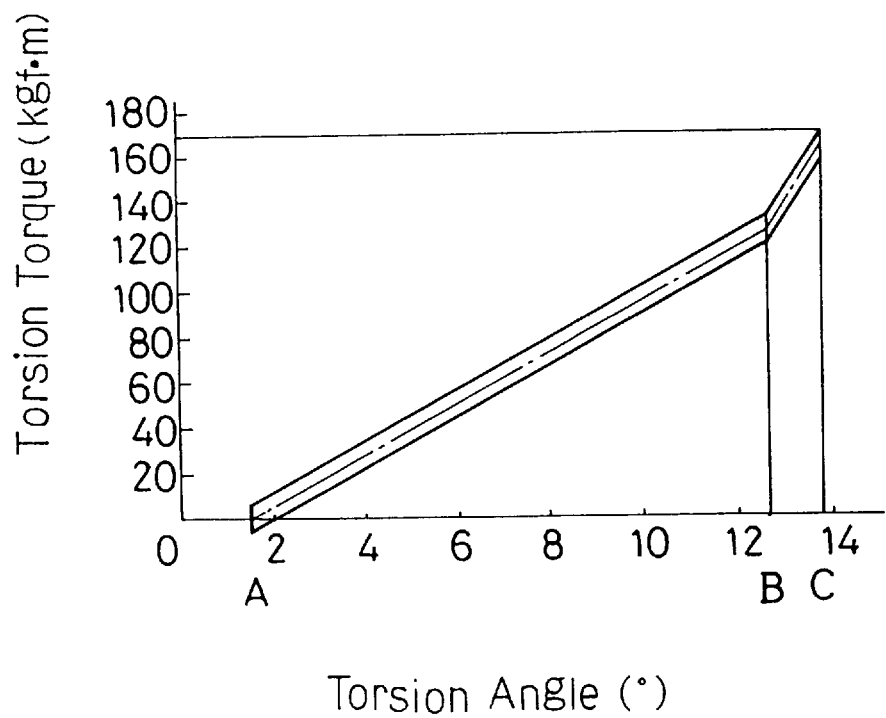
FIG. 14 is a graph showing torsion characteristics of the clutch disk assembly depicted in FIGS. 8–13.

Initial Displacement Range between 0 to A in FIG. 14

The hub 112 rotates relatively to the first and second retaining plates 107 and 108. In this range, frictional sliding occurs between an engagement plate 139 and a stationary washer 138 to cause a small hysteresis torque.

First Displacement Range from A to B in FIG. 14

Figure 10:
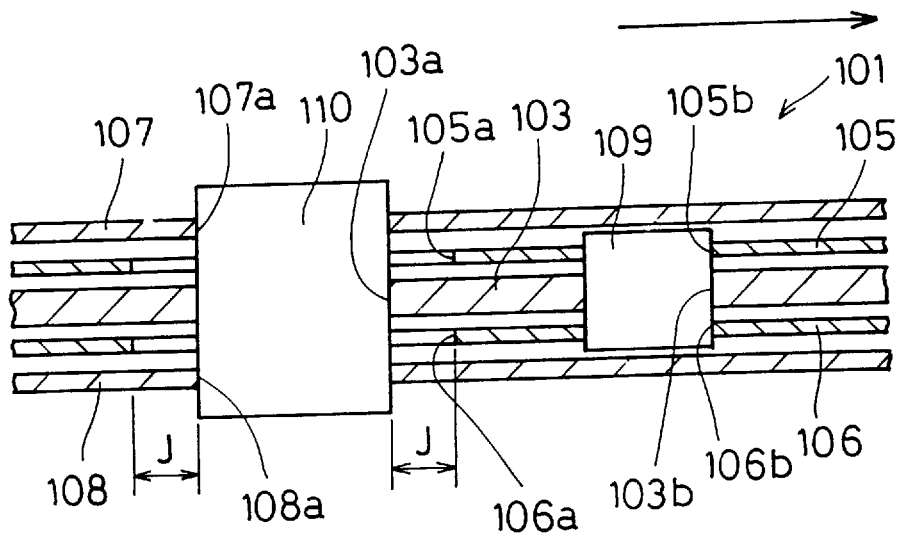
FIG. 10 is a fragmentary, cross-sectional view showing schematically the relative position of the displaceable components of the clutch disk assembly shown in FIGS. 8 and 9, with the components shown in a first position during torque transmission but showing no relative displacement.
Figure 11:
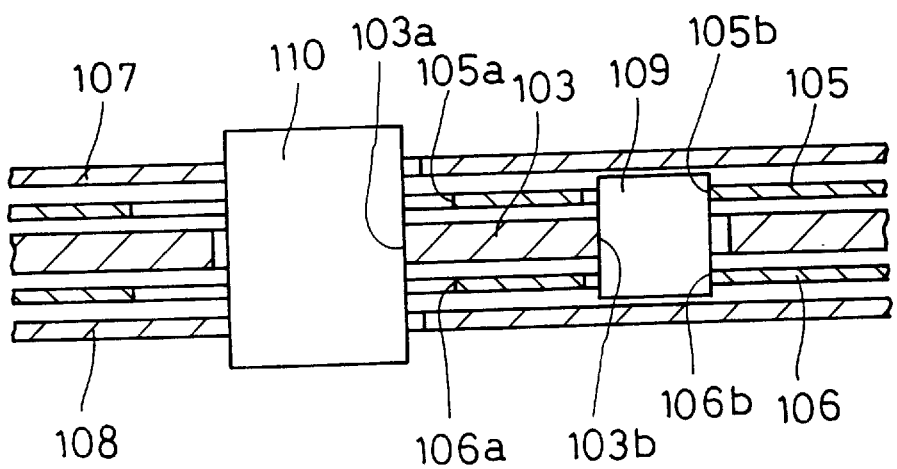
FIG. 11 is similar to FIG. 10, but shows the components of the clutch disk assembly undergoing a first level of relative displacement during torque transmission.

In FIG. 14, when the torsion angle increases to A, outer teeth 112b are brought into contact with inner teeth 107d and 108d, and the first and second retaining plates 107 and 108 start to rotate together with the hub 112. Thereafter, as shown in FIGS. 10 and 11, the second and first coil springs 110 and 109 operate in series between the first and second retaining plates 107 and 108 and the first and second sub-plates 105 and 106 through the flange plate 103. In this operation, both the first and second coil springs 109 and 110 are compressed, so that the characteristics exhibit a low rigidity. Since the first coil spring 109 has a lower rigidity than the second coil spring 110, it is compressed to a higher extent than the second coil spring 110.

In the above range, two third friction washers 128 frictionally slide between the first and second sub-plates 105 and 106 and friction plates 129 rotating together with the first and second retaining plates 107 and 108. Consequently, a large hysteresis torque is generated.

Second Displacement Range from B to C in FIG. 14

Figure 12:
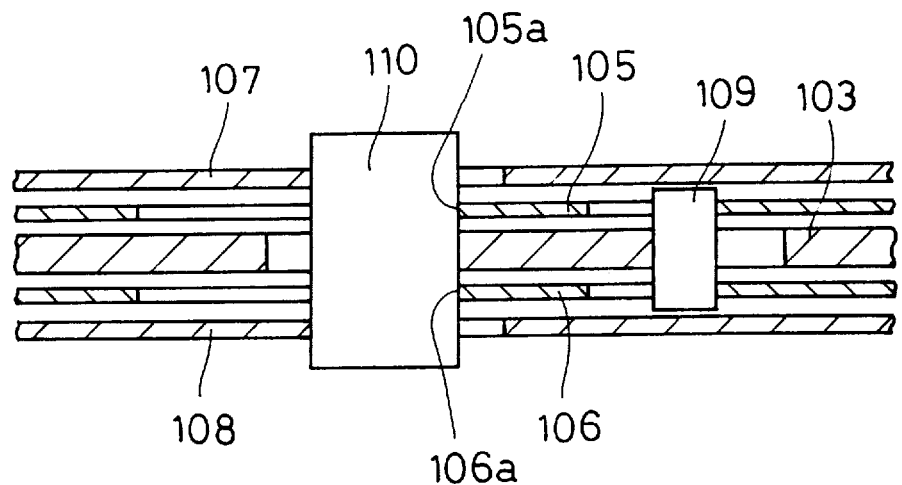
FIG. 12 is similar to FIGS. 10 and 11, but shows the components of the clutch disk assembly undergoing a second level of relative displacement during torque transmission.
Figure 13:
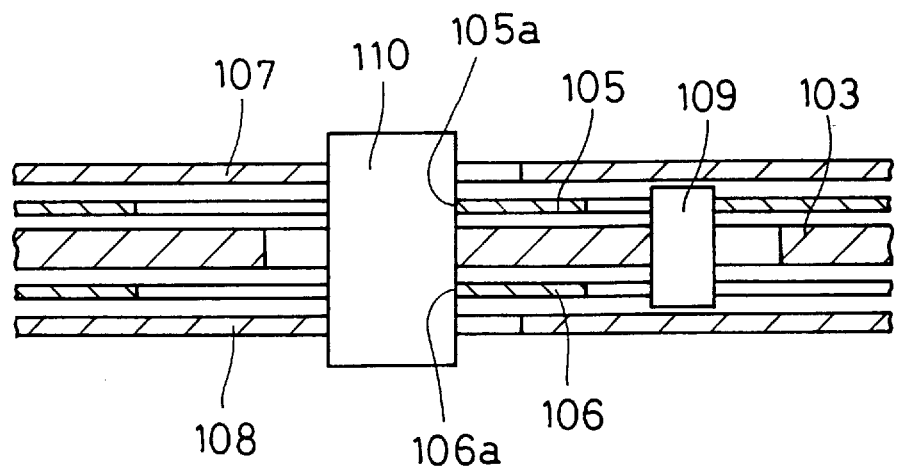
FIG. 13 is similar to FIGS. 10, 11 and 12, but shows the components of the clutch disk assembly undergoing a third level of relative displacement during torque transmission.

In FIG. 14, when the torsion angle increases to B, ends of the second coil springs 110 are brought into contact with the first windows 105a and 106a of the first and second sub-plates 105 and 106 as shown in FIG. 12, and thereafter, the second coil springs 110 are compressed between the first and second retaining plates 107 and 108 and the first and second sub-plates 105 and 106. In this operation, as shown in FIG. 13, the flange plate 103 does not receive the torque from the first and second retaining plates 107 and 108, and therefore do not rotate relatively, so that the first coil springs 109 are not further compressed. Thus, only the second coil springs 110 are compressed, so that the characteristics exhibit a high torsion rigidity. When the second stop pins 132 are brought into contact with the edges of pin travel apertures 103d, the first and second retaining plates 107 and 108 rotate no longer relatively to the sub-plates 105 and 106 (the point C in FIG. 14).

In this range, the two third friction washers 128 frictionally slide between the first and second sub-plates 105 and 106 and the friction plates 129 rotating together with the first and second retaining plates 107 and 108. Consequently, a large hysteresis torque is generated.

In this embodiment, the rivets 119 for fixing the frictional coupling portion 102 are also used to fix the first and second sub-plates 105 and 106 together, so that the first stop pins employed in the first embodiment are not required.

In this embodiment, since the flange plate 103 for coupling the first and second coil springs 109 and in series is made of a single member, the manufacturing cost can be low.

In the damper disk assembly according to this embodiment, since the first and second elastic members are disposed at radially shifted positions, the whole structure can be compact. Further, a high torque can be ensured by such a structure that the second elastic members at the radially outer positions operate to transmit a torque in a range of a large torsion angle.

Further, the first and second elastic members have different rigidities, so that one of the elastic members is compressed to a higher extent than the other when both of them are compressed. This reduce a rigidity at a first stage compared with a structure in which both the elastic members have the same rigidity.

Since the first elastic member is disposed axially between the paired members of the third circular rotary member, it is not necessary to form windows or the like at the paired members of the first circular rotary member, so that the paired members of the third circular rotary member can have an improved durability against the torque transmission.

By employing the cushioning plate at the frictional coupling portion having the friction members made of a composite material of metal and ceramics, cushioning property can be obtained, and wear of the friction member can be reduced owing to reduction in surface pressure of the friction member.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed:

1. A damper disk assembly comprising:

a hub member;

a pair of retaining plates engaged with said hub;

a flange plate concentrically disposed between said pair of retaining plates;

a pair of sub-plates concentrically disposed between said pair of retaining plates, said flange plate being disposed between said pair of sub-plates;

a friction coupling portion attached to a radially outer portion of said pair of sub-plates;

a first elastic member circumferentially disposed within first windows formed in said flange plate and said pair of sub-plates, said first elastic member being compressible in response to relative rotary displacement between said pair of sub-plates and said flange plate, said first elastic member thus limiting relative rotary displacement between said flange plate and said pair of sub-plates;

a second elastic member disposed within second windows formed in said pair of retaining plates, said sub-plates and said flange plate, said second window in said sub-plates having a circumferential length greater than said second windows formed in said retaining plates and said flange plate, said second elastic member being compressible in response to relative rotary displacement between said flange plate and said pair of retaining plates thus limiting relative rotary displacement between said flange plate and said pair of retaining plates, and said second elastic member being radially offset from said first elastic member;

wherein said first and second elastic members both being compressible in response to relative rotary displacement within a first displacement range defined between said pair of retaining plates, said pair of sub-plates and said flange plate, and in a second displacement range said second window in said sub-plates contacts said second elastic member such that said sub-plates and said flange plate rotate together with respect to said pair of retaining plates further compressing said second elastic member; and wherein the damper disk assembly torque is generally configured for transmitting torque from said friction coupling portion to said pair of sub-plates, from said sub-plates to said flange plate, from said flange plate to said pair of retaining plates and from said retaining plates to said hub.

2. The damper disk assembly according to claim 1, wherein said first and second elastic members have differing levels of rigidity.

3. The damper disk assembly according to claim 1, wherein said first elastic member is disposed axially between said pair of sub-plates and said flange plate.

4. The damper disk assembly according to claim 1, wherein said hub is disposed concentric and radially inwardly with respect to said pair of retaining plates, said pair sub-plates and said flange plate, said hub being configured for limited rotary displacement within an initial displacement range with respect to said pair of retaining plates.

5. The damper disk assembly according to claim 4, further comprising a friction generating mechanism disposed between said pair of retaining plates and said hub for generating friction in response to relative rotary displacement between said pair of retaining plates and said hub in said initial displacement range.

6. The damper disk assembly according to claim 1, further comprising a first friction generating mechanism disposed between said pair of retaining plates and said sub-plates for generating friction in response to relative rotary displacement between said pair of retaining plates and said sub-plates.

7. The damper disk assembly according to claim 6, further comprising a second friction generating mechanism disposed between said pair of sub-plates and said flange plate for generating friction in response to relative rotary displacement between said pair of sub-plates and said flange plate in said initial displacement range.

8. A damper disk assembly comprising:

a hub member;

a pair of retaining plates engaged with said hub;

a flange plate concentrically disposed between said pair of retaining plates;

a pair of sub-plates concentrically disposed between said pair of retaining plates, said flange plate being disposed between said pair of sub-plates;

a friction coupling portion attached to a radially outer portion of said pair of sub-plates;

a first elastic member circumferentially disposed within first windows formed in said flange plate and said pair of sub-plates, said first elastic member being compressible in response to relative rotary displacement between said pair of sub-plates and said flange plate, said first elastic member thus limiting relative rotary displacement between said flange plate and said pair of sub-plates;

a second elastic member disposed within second windows formed in said pair of retaining plates, said sub-plates and said flange plate, said second window in said sub-plates having a circumferential length greater than said second windows formed in said retaining plates and said flange plate, said second elastic member being compressible in response to relative rotary displacement between said flange member and said pair of retaining plates thus limiting relative rotary displacement between said flange plate and said pair of retaining plates, and said second elastic member being radially offset from said first elastic member;

a first friction generating mechanism disposed between said pair of retaining plates and said sub-plates for generating friction in response to relative rotary displacement between said pair of retaining plates and said sub-plates;

wherein said first and second elastic members both being compressible in response to relative rotary displacement within a first displacement range defined between said pair of retaining plates, said pair of sub-plates and said flange plate, and in a second displacement range said second window in said sub-plates contacts said second elastic member such that said sub-plates and said flange plate rotate together with respect to said pair of retaining plates further compressing said second elastic member; and wherein the damper disk assembly torque is generally configured for transmitting torque from said friction coupling portion to said pair of sub-plates, from said sub-plates to said flange plate, from said flange plate to said pair of retaining plates and from said retaining plates to said hub.

9. The damper-disk assembly according to claim 8, wherein said first and second elastic members have differing levels of rigidity.

10. The damper disk assembly according to claim 8, wherein said first elastic member is disposed axially between said pair of retaining plates.

11. The damper disk assembly according to claim 8, further comprising a second friction generating mechanism disposed between said pair of sub-plates and said flange plate for generating friction in response to relative rotary displacement between said pair of sub-plates and said flange plate in said initial displacement range.

12. The damper disk assembly according to claim 8, further comprising:

a plurality of pins extending between said retaining plates and being fixed to said retaining plates, said pins extending though corresponding circumferentially extending slots formed in said pair of sub-plates, said pins further extending through an opening formed in said flange plate, said opening in said flange plate having a circumferential length shorter than a circumferential length of said slots in said pair of sub-plates.

13. The damper disk assembly according to claim 8 wherein said hub is disposed concentric and radially inwardly with respect to said pair of retaining plates, said pair sub-plates and said flange plate, said hub being configured for limited rotary displacement within an initial displacement range with respect to said pair of retaining plates.

14. The damper disk assembly according to claim 13, further comprising a second friction generating mechanism disposed between said pair of retaining plates and said hub for generating friction in response to relative rotary displacement between said pair of retaining plates and said hub in said initial displacement range.

\* \* \* \* \*